United States Patent

[11] 3,539,217

[72] Inventor Otto Szekely,
Miami, Fla.
Apt. Norwich M 290,
Century Village, West Palm Beach|Fla.
33401)
[21] Appl. No. 767,702
[22] Filed Oct. 15, 1968
[45] Patented Nov. 10, 1970

[54] SELF-RELEASING CARGO HOOK
8 Claims, 9 Drawing Figs.
[52] U.S. Cl. .................................................. 294/83
[51] Int. Cl. .................................................. B64d 17/38
[50] Field of Search .......................................... 294/83,
83.1, 83.10, 82

[56] References Cited
UNITED STATES PATENTS
2,131,445 9/1938 Lawton ........................ 294/83(.1)UX
2,410,816 11/1946 Frieder et al. ................ 294/83(.1)UX
2,490,558 12/1949 Sullivan ........................ 294/83(.1)UX Primary Examiner—Andres H. Nielsen
Attorney—Ernest H. Schmidt ABSTRACT: A self-releasing cargo hook having a main hook member and a safety latch member both rotatively journaled with respect to the hook body and having interacting cam-action walking beam mechanism operative, upon the weight of the cargo load sling being applied to a hook portion of the safety latch member at the beginning of the lifting operation, to rotate the safety latch member and the cooperative main hook member from unlatched and released positions, respectively, to latched and sling-hooking positions, the hook portion of the safety latch moving so as to deposit the cargo load sling into the crotch of the main hook member just prior to completion of the latching operation. Additionally, cam mechanism controlled by the force imposed by the weight of the cargo being lifted is provided for locking the safety latch member in place upon the load being lifted from the ground. Upon deposit again of the load, the safety latch locking mechanism will first be released, after which, upon slackening of the sling, the safety latch mechanism will return to unlatching position and the cooperative hook member will swing to open position to automatically release the cargo sling.

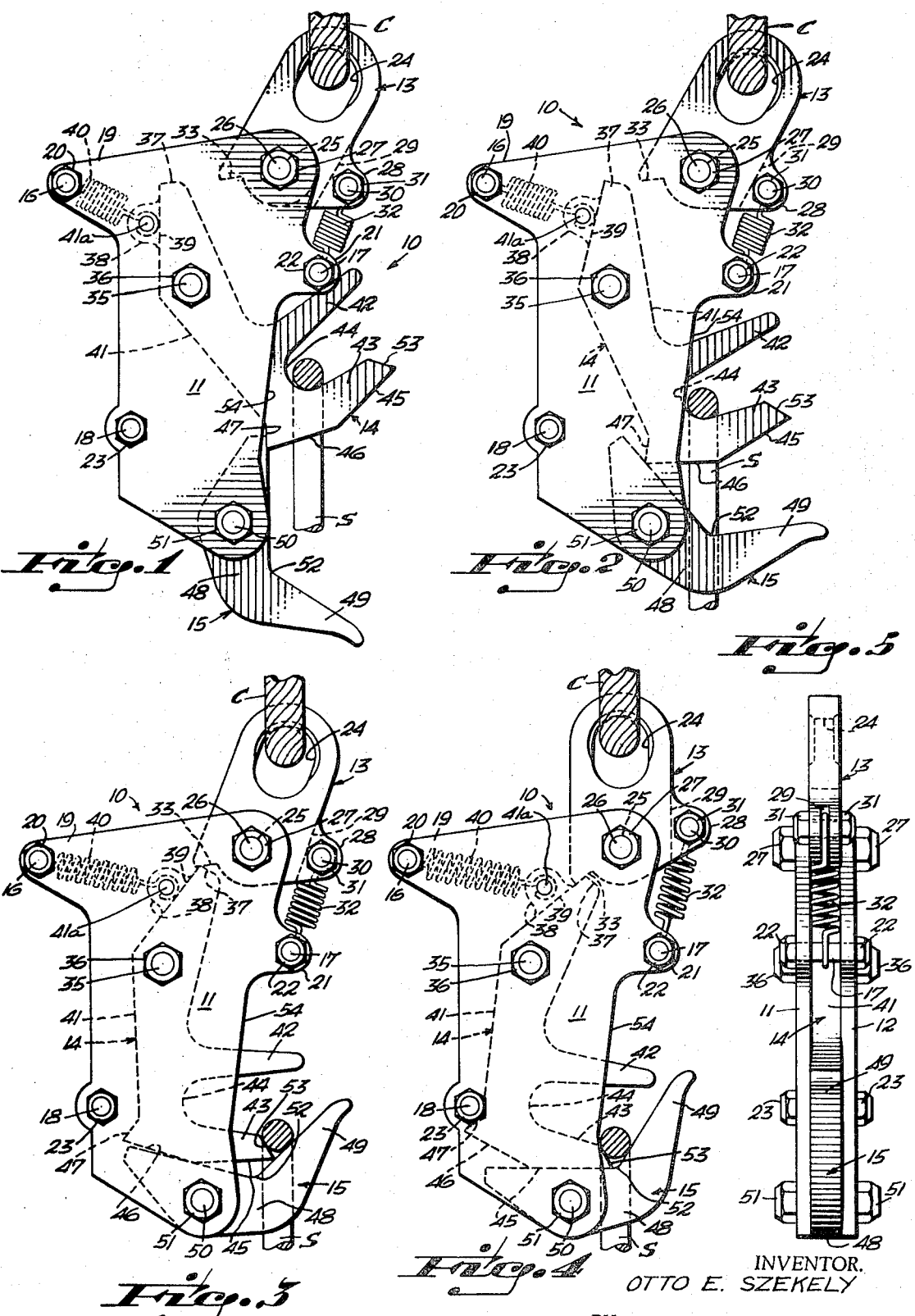

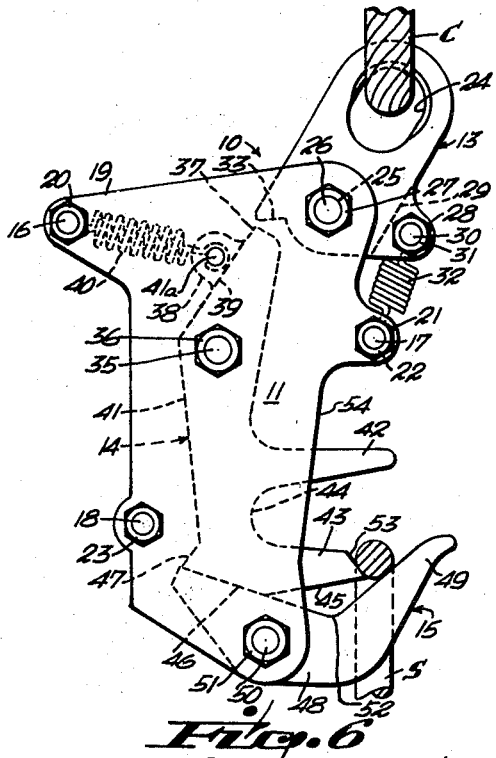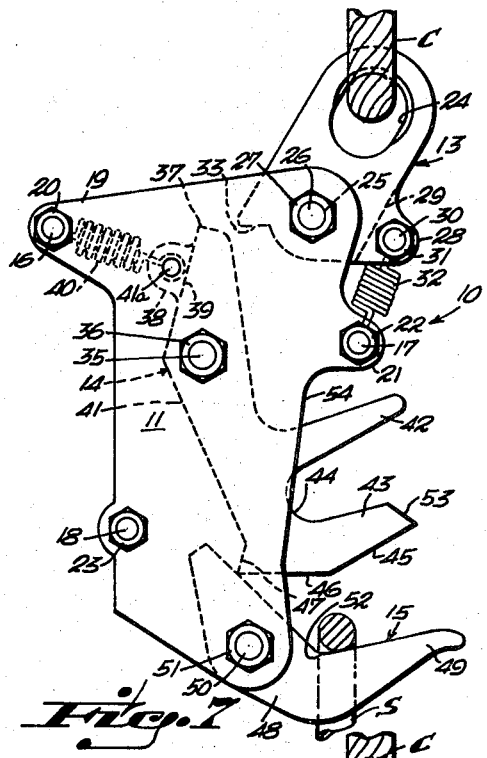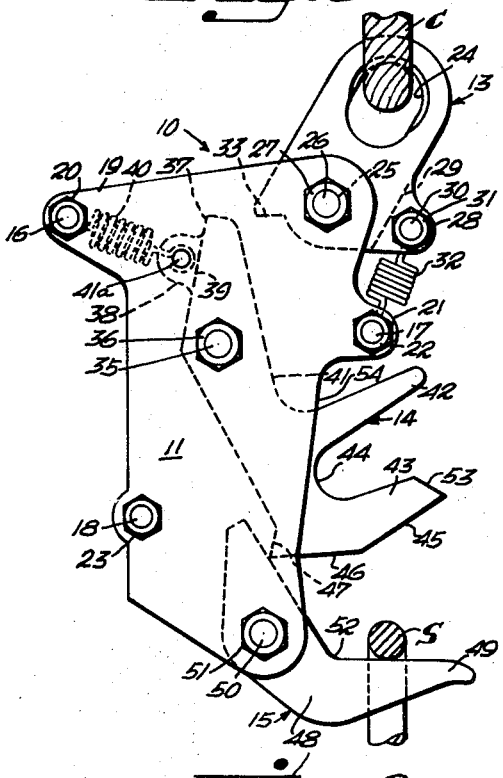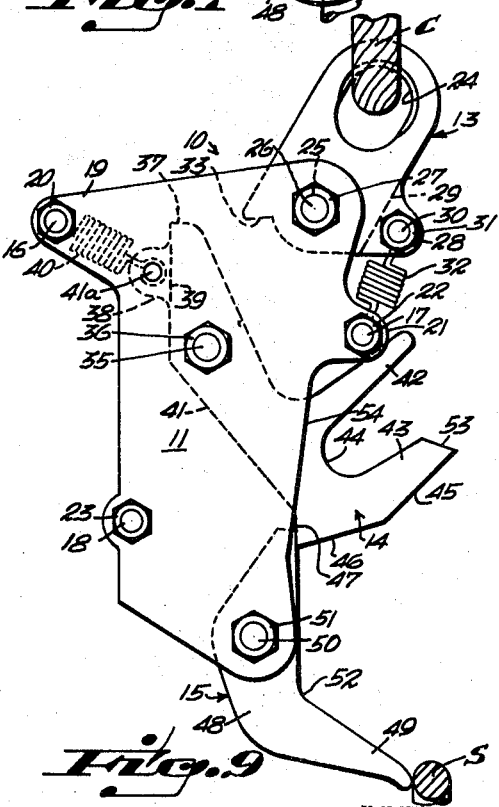

SELF-RELEASING CARGO HOOK

This invention relates to hooks of the type used in transporting cargo from one place to another and is directed particularly to a new and improved self-engaging and self-releasing cargo hook.

In the transportation of heavy cargo from one place to another, in shipping, industrial and military supply and rescue operations, for example, winch-equipped derrick booms, cranes, helicopters and the like, controlling vertical lifting cables terminating in hooks adapted to engage with slings on the cargo loads to be lifted are commonly used. Since ordinary U-shaped hooks cannot be manipulated and controlled for engagement and disengagement with the cargo load by the lifting equipment operator at his position remote from the cargo, it is common practice to employ extra workmen to manually engage and disengage the cargo hooks. Such assistance is particularly necessary when the cargo is to be removed from or placed in the hold of a ship, where the equipment operator above deck will ordinarily not even be able to see the stowage area. Needless to say, because of the weight and swinging action of the hook and its supporting cable in moving in and out of the ship's hold, the job of engaging and disengaging the cargo hook is a very dangerous one. Accidental breakaway and release of the cargo in loading operations is most hazardous to the workmen standing beneath the load as it is being lowered. Possible accidental breakage of the steel lifting cables offers still another real danger to cargo hook handlers.

For the foregoing reasons, as well as for reasons of economical usage of labor, various attempts have heretofore been made to devise a self-engaging and/or self-releasing cargo hook.

Among such automatic cargo hooks as have heretofore been used, are hooks having solenoid or motor-actuated hook-engaging means wherein the hooking mechanism is controlled for engagement and disengagement with the cargo sling by the equipment operator through switching devices connected by means of an electrical cable following the course of movement of the lifting cable. Such systems are not only expensive and subject to breakdown because of the rough usage to which the electrical cable is necessarily subjected, but also are deficient in that it is still necessary for the equipment operator to see the hook in order to know when to open it for the release of cargo.

It is, accordingly, the principal object of this invention to obviate the above-described deficiencies of cargo hooks heretofore known by the provision of a new and improved cargo hook which will be fully automatic both with respect to hooking and releasing operations and which at the same time will be entirely self-contained.

Another object is to provide a cargo hook of the above nature having a safety latch member operative to close over and lock the cargo sling in its hooked position in the crotch of the hook member prior to lifting the cargo load and which remains in locked position until after the load has been redeposited, thereby affording protection against the load accidentally unhooking itself. This is particularly important in instances wherein lifting or carrying is being accomplished by means of a helicopter moving through the air and thereby subjecting the cargo cable to substantial variations in lifting force and cable tension, including violent side swing and exceptional values of negative forces.

A more particular object is to provide a cargo hook of the character described wherein the safety latch member and the main hook member are both rotatively journaled with respect to the hook body in a cooperative cam-action walking beam arrangement wherein the weight of the cargo load sling on a hook portion of the safety latch member at the beginning of the lifting operation serves to rotate the safety latch and the cooperative main hook member from unlatched and released positions, respectively, to latched and sling-hooking positions, the hook portion of the safety latch moving so as to deposit the cargo load sling into the crotch of the main hook member just prior to completion of the latching operation.

Still another object of the invention is to provide a cargo hook of the character described wherein upon lifting of the cargo from the ground the force developed in the cable by the weight of the load being lifted will control mechanism operative to lock the safety latch member in place, preventing its movement and the possibility of opening of the main hook member while the cargo is in lifted position.

Yet another object is to provide a cargo hook of the above nature wherein upon the deposit of the cargo load, cooperative means will first, upon touchdown of the load, release the safety latch locking mechanism and, thereafter, upon slackening of the sling, return the safety latch member to unlatching position whereat the cooperative main hook member will be permitted to swing to open or release position under gravitational force for automatically dropping or releasing the cargo sling.

Still other objects are to provide a self-releasing cargo hook of the above nature which will be simple in construction, economical to manufacture, compact, durable, fool-proof in operation and dependable in use.

Other objects, features and advantages of the invention will be apparent from the following description when read with reference to the accompanying drawings. In the drawings, wherein like reference numerals denote corresponding parts throughout the several views:

FIG. 1 illustrates, in side elevation, a self-releasing cargo hook embodying the invention, shown in release position and just prior to lifting a cargo load, the cargo sling being shown positioned in the hook portion of the latching member just prior to the beginning of a lifting operation;

FIG. 2 is a view similar to FIG. 1 illustrating operation of the hook mechanism from the beginning of pulling upon the sling and shows how the clockwise turning effected thereby upon the latching member serves to turn the main hook member from open to closed positions through the interacting walking beam arrangement;

FIG. 3 illustrates the hook in its position where all slack has been taken up on the sling in the lifting operation and wherein the increased load beginning to be applied upon the hook mechanism by the load being lifted begins to lock the latching member and the main hook member in place, the sling at this point having dropped into the crotch zone of the now closing main hook member;

FIG. 4 shows the hook in load-lifting position with the latching member fully locked, the main hook member in fully closed and locked position and the latch finger portion of the latch member disposed in closing relation with respect to the outer end or nose of the now-closed hook member;

FIG. 5 is a front elevational view of the cargo hook as shown in FIG. 4;

FIG. 6 is a side elevational view of the hook illustrating its operation upon release of a cargo load and showing how, upon first touching the load to its place of deposit, the lifting eye and its associated cam will first be turned out of locking engagement with respect to the latching member, permitting it to begin its counterclockwise movement to release position; and FIGS. 7, 8 and 9 illustrate, progressively, the anticlockwise rotational movement of the latching member and the cooperative clockwise movement of the hook member in their interacting walking beam arrangement, whereby the latching mechanism is carried upwardly away from the main hook member and, at the same time, the main hook member is permitted to fall into fully opened position for automatic discharge of the cargo sling to complete the release of the cargo.

Referring now in detail to the drawings, reference numeral 10 indicates, generally, a preferred form of self-releasing cargo hook embodying the invention, the same being comprised of left and right hand side plates 11, 12, respectively, a lifting eye 13 and auxiliary hook and latching member 14 and a main hook member 15, all of which may be fabricated of steel or another strong material. The side plates 11 and 12 are secured in spaced, parallel relation by three spacer stud members 16, 17 and 18, the spacer stud member 16 being secured between rearwardly,extending portions 19 of said plates near the upper ends thereof with locknuts 20, the spacer stud member 17 being secured between forwardly-extending lug portions 21 of said plates at the front thereof with self-locking nuts 22, and the spacer stud member 18 being secured between said plates near the lower ends thereof at the rear, with self-locking nuts 23.

The lifting eye 13 is formed with an eyelet opening 24 near its upper end for attachment of a lifting cable C and is provided near its lower end with an aperture 25 receiving a journal stud pin 26 journaling and lifting eye between the side plates 11, 12 at a front upper position therebetween. The journal stud 26 is secured in place by means of self-locking nuts 27 at the outsides of the side plates 11 and 12. The lifting eye 13 is also formed with a forwardly-projecting portion 28 near the lower end thereof which is longitudinally slotted, as indicated at 29 and as best illustrated in FIG. 5, and provided with a transversely-extending, spring-retaining stud pin 30 secured in place by the use of self-locking nuts 31. One attachment end of a helical tension spring 32 extends through the slot 29 to hookingly engage the spring-retaining stud pin 30, the other end of said spring being attached in hooking engagement over the spacer stud member 17 at a location between the side plates 11 and 12. As illustrated in FIGS. 1 and 2, for example, the spring arrangement is such that when in released position of the hook, the tensional force of the spring will yieldingly urge the lifting eye 13 forwardly or to the right of the hook structure as seen in FIGS. 1 and 2 with the eyelet opening 24 thereof out of vertical alignment with the pivotal axis defined by the journal stud 26. The lifting eye member 13 is also formed with an integral locking cam portion 33 extending outwardly of the lower end and to the rear thereof for locking the hook in closed position as is hereinbelow described.

The auxiliary hook and latching member 14 is of generally elongated shape and journaled at a central portion thereof between the side plates 11, 12 by a journal stud pin 35 secured in place at each side of said side plates by self-locking nuts 36. The auxiliary hook and latching member 14 comprises an upwardly-extending lever arm portion 37 near the outer end of which is provided a rearwardly-extending protuberance or lug 38 having a longitudinal slot 39. A helical tension spring 40 arranged between the side plates 11, 12 has one end extending into the longitudinal slot 39 and attached to a retaining pin 41a transversely fixed in an aperture in the rearwardly-extending lug 38 and the other end secured to the spacer stud member 16 joining the rearwardly-extending portions 19 of the plates 11, 12 for normally constraining the auxiliary hook and latching member 14 in its counterclockwise-most position, as illustrated in FIG. 1. The auxiliary hook and latching member 14 is also formed with a downwardly-extending lever arm portion 41 integrally formed with a forwardly and outwardly-extending latching finger portion 42 and, at the outer end of said downwardly-extending lever arm portion, with a forwardly-extending auxiliary hook portion 43, defining with said latching finger portion, a generally U-shaped bight 44. The terminal end of the downwardly-extending lever arm portion 41 of the auxiliary hook and latching member 14 is formed with a first rectilinear sole portion 45 opposite the bight 44, and a second rectilinear sole portion 46 defining an obtuse angle with the first sole portion 45 and terminating at its outer end in a rectilinear heel portion 47 defining an acute angle with the second sole portion 46.

The main hook member 15 is formed with a body portion 48 and a nose portion 49, said body portion being journaled between the side plates 11, 12 at the lower, forwardly-extending end portions thereof by a journal stud pin 50 secured in place by locknuts 51. The body portion 48 and nose portion 49 of the main hook member 15 meet at an obtuse angle to define a crotch portion 52 for hooking engagement with the carrier sling of a cargo load to be carried, as is hereinafter described.

Referring now to FIGS. 1 through 5 of the drawings and considering first the operation of the hook mechanism in lifting a cargo load, FIG. 1 illustrates the hook in released position just prior to lifting a cargo load, the cargo sling S being shown positioned in the bight 44 of the auxiliary hook and latching member 14. It will be seen that in the released position, the auxiliary hook and latching member 14 will be at its counterclockwise-most position with respect to the body of the hook, (comprised of the side plates 11, 12), in which position it is resiliently constrained by the helical spring 40, the limit position being determined by the abutment of the latching finger portion 42 of the said auxiliary hook and latching member with the spacer stud member 17. In this position, the rear end of the body portion 48 of the hook member 15 abuts the heel portion 47 of the auxiliary hook and latching member 14 to hold said hook member in released position.

FIG. 2 illustrates the hook mechanism upon the hook cable C attached to the lifting eye 13 just beginning to pull on the hook in a load lifting operation, and shows how the tensional force thus being applied to the sling S results in turning the auxiliary hook and latching member 14 downwardly in the clockwise direction, the reaction spring 40 being of substantially lesser strength than the lifting eye spring 32. It will be noted that when the hook mechanism is in the release position, as shown in FIG. 1, the heel portion 47 of the auxiliary hook and latching member 14 will be in abutment with the upper end of the body portion 48 of the main hook member 15, so that as said auxiliary hook and latching member rotates clockwisely, said main hook member will be moved counterclockwisely to rotate its nose portion 49 upwardly and forwardly of the body of the hook and under the auxiliary hook portion 43 of said auxiliary hook and latching member.

FIG. 3 illustrates how, upon additional lifting force being effected by the lifting cable C, all the slack will have been taken up on the sling S just prior to lifting of the load, and the auxiliary hook and latching member 14 will have rotated still further in a clockwise direction preparatory to lifting the load and the main hook member 15 will be cooperatively further moved into the anticlockwise direction by operation of the heel portion 47 having moved over and beyond the upper surface of the body portion 48 of the said main hook member. At this point, the second and first sole portions 46 and 45, respectively, of the auxiliary hook and latching member 14 will move successively over the upper surface of the hook body portion 48, in walking-beam fashion, to terminate in a latching position whereat said second sole portion abuts in face-to-face engagement therewith, as illustrated in FIG. 4. In this limit position, the heel portion 47 of the auxiliary hook and latching member 14 will abut the spacer stud member 18, thereby affording even greater structural rigidity and integrity when the hook mechanism is in load-carrying condition.

It will be noted that during the lifting operation just described, the sling S will have been discharged from the bight 44 of the auxiliary hook and latching member 14 into the crotch of the main hook member 15, being aided in such discharge by sliding contact with the angular front surface portions 54 of the body portion side plates 11, 12, and the finger portion 42 of the said auxiliary hook and latching member will have moved in the direction of the upwardly-moved nose portion 49 of said main hook member to act as a latch for the cargo sling S while associated cargo load is being carried.

Referring again to FIG. 4 of the drawings, it will be seen that upon the auxiliary hook and latching member 14 and its associated main hook member 14 having reached their terminal positions, as described above, in a cargo-lifting operation, additional tensional force being applied by the load on the lifting cable C will cause the lifting eye 13 to move counterclockwisely about its journal stud 26, whereupon the locking cam portion 33 of said lifting eye will be moved into abutment with the rear surface portion at the upper end of the upwardly-extending portion 37 of the auxiliary hook and latching member 14, serving to maintain it in sling-locking position as described above.

Referring now to FIGS. 6 through 9 in the drawings, and considering how automatic release of the cargo sling S is effected, it will be seen that, as illustrated in FIG. 6, upon deposit of the load, the lifting eye 13 will first move counterclockwise to unlocking position with respect to the auxiliary hook and latching member 14 under the influence of the relatively strong helical spring 32, and the auxiliary hook and latching member 14 will then begin to move counterclockwisely, pushing the sling S forwardly through abutment therewith of the angular front edge 53 of the auxiliary hook portion 43 of said auxiliary hook and latching member 14. FIGS. 7, 8 and 9 illustrate, progressively, the further counterclockwise rotational movement of the auxiliary hook and latching member 14 and the clockwise movement of the main hook member 15 in their interacting walking-beam arrangement, as described above, whereby the latching mechanism is carried away from the main hook member and, at the same time, the main hook member is permitted to fall into fully open position for automatic discharge of the cargo sling S to complete the automatic release of the cargo. Upon such release of the cargo sling S, the hook mechanism will again be in the position illustrated in FIG. 1, ready to hook into another sling, as described above, in the next cargo-lifting operation.

While I have illustrated and described herein only one form in which my invention can conveniently be embodied in practice, it is to be understood that this form is given by way of example only and not in a limiting sense.

I claim:

1. A self-releasing cargo hook comprising, in combination, a hook body structure, a main hook member having a hook body portion and a hook nose portion defining together a hook crotch for the reception of a cargo sling, the body portion of said hook member being rotatively journaled with respect to the lower end of said hook body structure, a safety latch member rotatively journaled with respect to said hook body structure above said main hook member, means normally resiliently constraining said safety latch member in a first rotative position with respect to said hook body structure, said safety latch member comprising at its lower end portion an auxiliary hook portion defining a bight for the reception of a cargo sling in a cargo lifting operation, lifting eye cable connector means at the upper end of said hook body structure, said safety latch member being operative to be moved from said first rotative position to a second rotative position with respect to said hook body structure upon a first tensional force being applied between a cargo sling hooked in said auxiliary hook portion bight and lifting cable means connected to said lifting eye, and cam means interconnecting said safety latch member and said main hook member for rotating said hook member with respect to said body structure from a release position whereat said hook nose portion is directed downwardly to hooking position whereat said nose portion is directed upwardly upon said safety latch member being moved from said first to said second position, said safety latch member being operative to discharge the sling into said main hook crotch upon being moved to said second position, said safety latch member further comprising a latching finger portion operative to move into closing relation over said main hook crotch when said main hook member is in hooking position.

2. A self-releasing cargo hook as defined in claim 1 wherein said lifting eye cable connector means comprises a lifting eye member rotatively journaled to said hook body structure above said safety latch member, means yieldingly urging said lifting eye member in a first rotative position with respect to said hook body structure, said lifting eye member being operative to be moved from said first rotative position to a second rotative position with respect to said hook body structure upon a second tensional force greater than said first tensional force being applied between a cargo sling hooked in said main hook crotch and said lifting eye member, and cam means operative upon said lifting eye member being moved from said first to said second position for locking said safety latch member in said second rotative position.

3. A self-releasing cargo hook as defined in claim 2 wherein said cam means interconnecting said safety latch member and said hook member comprises walking-beam interacting surface portions between the outer end of said auxiliary hook portion of said safety latch member and an upper edge portion of said hook body portion of said main hook member.

4. A self-releasing cargo hook as defined in claim 3 wherein said hook body structure comprises a pair of spaced, parallel side plates, said hook member, said safety latch member and said lifting eye member each being journaled between said side plates.

5. A self-releasing cargo hook as defined in claim 4 including abutment means on said hook body structure operative to limit the movement of said safety latch member at the second rotative position thereof.

6. A self-releasing cargo hook as defined in claim 4 including abutment means on said safety latch member when in its first rotative position to limit said hook member at its released position.

7. A self-releasing cargo hook as defined in claim 4 wherein said means yieldingly urging said lifting eye member in said first rotative position comprises a spacer stud member fixed between said side plates, and a helical tension spring fixed at one end to said spacer stud member and at its other end to said lifting eye member, said spacer stud member also serving as an abutment member limiting said safety latch member in its first rotative position.

8. A self-releasing cargo hook as defined in claim 7 wherein said means normally resiliently constraining said safety latch member in its first rotative position comprises a helical tension spring applied between an upper end portion of said safety latch member and said hook body structure.